United States Patent
Mangipudi et al.

(10) Patent No.: US 7,124,188 B2
(45) Date of Patent: **\*Oct. 17, 2006**

(54) METHOD AND APPARATUS FOR POLICY BASED CLASS SERVICE AND ADAPTIVE SERVICE LEVEL MANAGEMENT WITHIN THE CONTEXT OF AN INTERNET AND INTRANET

(75) Inventors: Krishna Mangipudi, Nashua, NH (US); Vijay Basani, Nashua, NH (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/782,280

(22) Filed: Feb. 19, 2004

(65) Prior Publication Data
US 2004/0162901 A1    Aug. 19, 2004

Related U.S. Application Data

(63) Continuation of application No. 09/450,571, filed on Nov. 30, 1999, now Pat. No. 6,728,748.

(60) Provisional application No. 60/110,349, filed on Dec. 1, 1998.

(51) Int. Cl.
G06F 9/46   (2006.01)
G06F 15/73  (2006.01)

(52) U.S. Cl. ........................ 709/226; 718/105
(58) Field of Classification Search ............... 709/225, 709/224, 201, 202, 223; 718/103, 104, 105
See application file for complete search history.

(56) References Cited

U.S. PATENT DOCUMENTS

| | | | |
|---|---|---|---|
| 5,893,905 A | 4/1999 | Main et al. | 705/11 |
| 5,951,694 A | 9/1999 | Choquier et al. | 714/15 |
| 6,112,236 A * | 8/2000 | Dollin et al. | 709/224 |
| 6,189,033 B1 * | 2/2001 | Jin et al. | 709/225 |
| 6,279,001 B1 | 8/2001 | DeBettencourt et al. | 709/221 |
| 6,330,602 B1 | 12/2001 | Law et al. | 709/226 |
| 6,411,936 B1 | 6/2002 | Sanders et al. | 705/10 |
| 6,424,992 B1 | 7/2002 | Devarakonda et al. | 709/226 |
| 6,453,468 B1 | 9/2002 | D'Souza | 717/168 |
| 6,704,764 B1 * | 3/2004 | Ottati | 718/100 |
| 6,728,748 B1 * | 4/2004 | Mangipudi et al. | 718/105 |
| 6,760,910 B1 * | 7/2004 | Eilert et al. | 718/104 |

OTHER PUBLICATIONS

Pandey et al., Supporting Quality of Service in HTTP Servers, 1998, pp. 247-256, ACM.*

Web document, White Papers written by NetReference, Inc., Published Mar. 1997, "Service Level Agreements", web site: www.netreference.com/PublishedArchive/WhitePapers/SLA_white_paper.html, picked as of Nov. 22, 1999, 10 pages.

* cited by examiner

*Primary Examiner*—Larry D. Donaghue
(74) *Attorney, Agent, or Firm*—Brian L. Michaelis, Esq.; Brown Rudnick Berlack Israels LLP

(57) ABSTRACT

A method and apparatus for robustly enhanced Class of Service (COS) at the application layer permits highly flexible privilege based access and enables implementation of complex policies and rules for classification and differentiation of services. Differentiation facilitates categorization of traffic to permit flexible design and implementation of multiple Class of Service levels.

3 Claims, 13 Drawing Sheets

| Class | *Gold* |
|---|---|
| Precedence: | 2 |
| Load Balance: | RoundRobi |

| Source IP | Dest Port |
|---|---|
| 209.5.4.3 | 80 |
| 304.5.52.2 | 8080 |
| 2.4.3.4 | 9090 |

FIG. 8E

FTP

| IP In | Port In | Backend IP | Backend Port |
|---|---|---|---|
| 209.5.4.3 | 21 | 209.5.4.3 | 21 |
|  |  |  |  |
|  |  |  |  |

FIG. 8F

METHOD AND APPARATUS FOR POLICY BASED CLASS SERVICE AND ADAPTIVE SERVICE LEVEL MANAGEMENT WITHIN THE CONTEXT OF AN INTERNET AND INTRANET

Related Application

This application is a continuation of U.S. application Ser. No. 09/450,571, filed, Nov. 30, 1999, now U.S. Pat. No. 6,728,748, which claims priority from U.S. Provisional Patent Application Ser. No. 60/110,349, entitled IMPLEMENTATION OF POLICY BASED CLASS OF SERVICE (COS) AT THE APPLICATION LAYER WITHIN THE CONTEXT OF AN INTERNET AND INTRANET REQUEST (HTTP Request)—WEB BASED CLASS OF SERVICE (WEBCOS), filed Dec. 1, 1998, which is incorporated herein by reference.

FIELD OF THE INVENTION

The present invention relates to computer networks, and particularly to the assignment of infrastructure resources in the context of an internet and intranet.

BACKGROUND OF THE INVENTION

Organizations of all sizes are using the World Wide Web ("Web") for commerce and to improve productivity, market share and internal/external processes. Web sites have become a mission critical necessity in today's business environment. Under such mission critical conditions, unpredictable service levels will result in loss of revenue and market leadership. To avoid this costly impact, web sites must be highly available and dependable.

The Web is comprised of host computers that are contacted by one or several client computers via browsers. A high level protocol (i.e. at the application layer level in the layered OSI network model), Hypertext Transfer Protocol (HTTP), is used to open a connection to an indicated server, send a request, receive a reply and then display the contents of the reply to the user. In response to requests from client computers, host computers transmit data in the form of web pages. The servicing of these requests is typically performed on a "first come first served basis". Host computer resources are committed to servicing clients' requests, and, as a result there is a finite limit on the number of client computer requests that host computers can simultaneously handle. That is, when host computers receive several requests from many clients the host computers may not be able to service the requests in a timely fashion due to the depletion of the host computer resources. Further disadvantageously, under heavy loads host computers will completely stop accepting new requests until host computer resources are freed up, leaving clients seeking access to heavily used sites in some cases unable to gain access.

It is known that capacity-planning techniques such as over provisioning of computer resources to meet and exceed projected peak demands can alleviate this problem. However, this only increases the capacity of host computers to accept more connections and postpones the above-mentioned behavior. Due to the "first come first served" nature of the HTTP protocol the web site will admit and commit the host computer resources to the next request on the queue. When deployment is a corporate site, it is perfectly conceivable that under peak load this policy of treating every request uniformly will result in applying the corporate resource, such as the web site, inappropriately and indiscriminately resulting in a non-optimal use of the resource in the revenue generating process. On sites where e-commerce is conducted this can translate into a real loss of revenue.

In known networks, Class of service (Cos) is honored in the network infrastructure, i.e. at the physical/hardware level, and is implemented as a means of determining the network bandwidth that is appropriated to the flows based on and commensurate with pre-negotiated policies. Unfortunately, this known Cos policy is terminated at the network layer, below the Application layer, in the layered OSI network model. This means that end-to-end Cos is not presently available in known network configurations because once the flow reaches the application layer (Web layer or HTTP layer), there are no metrics to implement and honor Cos. Consequently, the notion of an end-to-end Cos policy in the context of a policy enabled network, such as an Internet or Intranet, breaks down and any negotiated differentiated service to the client is not universally available. Network based Cos does not deal with back-end server resource allocation, and it does not facilitate differentiation of service on the backend server. Thus even with network level Cos/Qos, all users will uniformly experience degradation of service as a result of back-end server utilization conditions (e.g. bottlenecks, overloads).

Site resource and performance management implementations are known for the intended purpose of improving host availability and dependability in the context of internets and intranets. Known "load balancing" implementations reallocate requests for overloaded servers to available servers. While such implementations monitor server loads and help to avoid disconnects due to overloading, they are typically based on a fixed or static algorithm that effects reallocation. Known load balancing techniques do not provide enhanced quality of service (QOS) as a function of client characteristics, rather QOS is enhanced only by reallocation of load. Load balancing implementations known in the art treat all requests equally, and merely re-direct traffic with little regard for the client generating the request or what the client is requesting or the nature of the transaction. In an ISP environment existing QOS solutions do not permit provision of differentiated services to each virtual site. High-end clients are treated the same as low-end clients. Known load balancing approaches have no mechanism to distinguish or prioritize users or transactions or requests. Thus even with implementation of load balancing there is still a first come first served policy. All requests are treated equally and there is no provisioning of resources based on a user or request.

One known implementation that purportedly provides enhanced QOS as a function of client characteristics is HP WebQos, available from Hewlett-Packard Company, Palo Alto, Calif. HP WebQos enhances web performance, capacity and availability only in the HP-UX operating environment. It permits site managers to prioritize web site service levels allowing higher service quality to be allocated as a function of certain, limited, client characteristics. HP WebQoS monitors service-levels and adjusts workload scheduling and processing rates based on policies configured by the administrator. The HP WebQoS technology prioritizes access as a function of client characteristics by scheduling HTTP requests into three different priority queues. The three queues are static and not further extensible, and control resources allocated to servers and applications. The implementation disadvantageously depends on a particular operating environment, and relies on a proprietary controller (i.e. Cisco LocalDirector), to effect functionality.

The HP WebQos architecture is illustrated in FIG. 1, and comprises essentially four components: a request controller 10, a service resource controller 12, a LocalDirector (LD) controller 14 to manage the proprietary CISCO LocalDirector, and a management system 16. The request controller 10 classifies requests into high, medium, or low priority based on a configured policy. The three priority levels are used to determine admission priority and performance-level. Classification into the three priority levels can be done as a function of: Source IP Address; Destination IP Address; URL; Port number; Hostname; and IP Type-of-service. Initial requests are classified, and thereafter a session is marked and all subsequent requests associated with that session continue to be classified at the same priority.

The request controller 10 controls admission decisions for new sessions, and admits, redirects, defers, or rejects new sessions based on the configured policy. Configurable admission policies are based on the user or service class and on various performance or resource conditions, such as CPU utilization, or length of queues handling the high, medium or low priority http requests. Admitted requests are queued into high, medium, and low priority queues. The queues are serviced based on the configured policy resulting in variation in performance at each level.

The service resource controller 12 manages hardware resource allocation. Greater resources are allocated per unit of workload for higher priority services. The service resource 12 controller controls allocation as a function of: percent CPU utilization and percent disk I/O utilization.

The LD Controller 14 runs on web servers and manages the proprietary Cisco LocalDirector. The LD Controller 14 dynamically manages server weights by setting Cisco LocalDirector's relative weights for each server in a cluster using SNMP_Set. Initial weights for each server are generated using tested throughput results. The LD Controller then dynamically adjusts the LocalDirector weightings to match each server's actual capacity during operation. The LD Controller is loaded on each server using the management system.

The management system 16 in HP WebQos provides a GUI for creating, editing, and deleting Service Level Objectives (SLOs). The SLOs are the capacity and performance objectives configured per user or service class. Admission of requests, resource allocation, and priority queue servicing are configured using the management system to issue directives to the request controller 10 and the service resource controller 12.

Disadvantageously, HP WebQos architecture is highly platform dependent, requiring a particular operating environment, HP-UX, and it relies on a proprietary controller, Cisco LocalDirector, to effect functionality, limiting its applicability to systems including those proprietary components. The implementation is focused on applying policy for differentiated services to categorize users into queues. Flash crowds, i.e. unusually high periodic traffic, requesting services may end up being categorized into one or the other of the queues, thus leading to a queue imbalance. As a result, traffic may end up being rejected in a queue despite availability of server resources to service these requests through another queue. Further, in a web farm configuration, HP WebQos does not permit implementation of class management at the back-end server. Only one load balancing mechanism is used for all back-end servers. The concept of categorizing back-end servers into various priority classes does not exist. The prioritization is limited to the (maximum) three front-end queues. Under circumstances of flash crowds, low priority users will be denied access to the site(s). This may result in long term business consequences, e.g. loss of revenue, and it will result in a negative quality experience for users. The notion of provisioning and reserving resources does not exist in the HP WebQos implementation.

Further, disadvantageously, the HP WebQos does not allow prioritization of traffic or site resources based on a virtual site in an ISP environment. Still further, dependence on the three front-end priority queues, significantly limits the allocation of services among classes by limiting the number of classes of requests as a function of the available queues. Accordingly, HP WebQos imposes a significant limitation on the differentiation of service(s) allocated to admitted requests. The three priority levels are used to determine only admission priority and performance-level, which again imposes a significant limitation on the differentiation of service(s) allocated to admitted requests. A limited number of client characteristics can be used to classify requests with HP WebQos, severely limiting the classification of traffic. In conjunction with the limited number of classification queues, the limited classification characteristics in HP WebQos makes administration of complex policies and rules for classification of requests virtually impossible. The limited classification characteristics in HP WebQos significantly limits client service differentiation and does not facilitate differentiation based on adaptive modeling of client behavior.

SUMMARY OF THE INVENTION

The present invention provides a method and apparatus for robustly enhanced Class of Service (COS) at the application layer (e.g. HTTP protocol layer), that permits highly flexible privilege based access and enables implementation of complex policies and rules for classification and differentiation of services. Differentiation at the application layer facilitates categorization of traffic to permit flexible design and implementation of multiple Class of Service levels.

According to the invention, a front-end processor or routing host, e.g. in the form of a TCP router, is configured to receive all client requests for sites and virtual sites implemented on a plurality of service hosts or back-end servers (or servers). A monitoring processor incorporating an Adaptive Policy Engine (APE), in communication with the router (and agents installed on back-end servers), dynamically monitors workload and availability of servers to enable requests to be sent to the most appropriate and optimal server. Incoming traffic is first processed to assign a class based on user defined policies. The APE is employed to monitor the incoming traffic to the routing host. Traffic is measured to each hosted site and further, to each class of a hosted site. The APE has a rules based engine that correlates this information and uses it to come up with a dynamic, real time balancing scheme for each hosted site. The APE or policy engine in conjunction with the router then intelligently distributes incoming traffic to the most available and/or efficient server within each class or "cluster," by using one or more of a plurality of selectable load distribution algorithms for the class/cluster, including: weighted percentage load balancing; round robin load balancing; CPU availability load balancing; probabilistic load balancing and least connections load balancing. Thus each back-end server in communication with the router is subject to a selectable one of a plurality of load balancing algorithms so that traffic is routed to the plurality of back-end servers, as a function of class, in a manner that maintains consistent response times and service level commitments even with increases in traffic and processing loads.

Intelligent agents deployed on each of the back-end servers monitor several server attributes/parameters and report back to the policy engine at the router. The server attributes (or service level metrics) reported to the router include: response time by user; URL; request; transaction type; content type; application type; service/protocol type; domain of origin; file size; online/offline status; total hits per second; CPU utilization (i.e. number of processors and percent utilization); number of processes; total open connections; disk space (i.e. disk size in bytes, bytes used, percent used, percent free); response times of back-end servers; URL/content availability; server and virtual site availability; application availability; and memory utilization (i.e. total memory, memory used, free memory). A subset of these attributes are monitored by the intelligent agents and reported back to the policy engine for each virtual site and for each web farm.

These parameters reported to the router are available via a Management Information Base (MIB) kept by the policy engine on the router. The information is also made available by the policy engine to application layer programs (i.e. on an NT platform via performance monitoring registers, "perfmon registers"). The policy engine uses this information, in conjunction with the router, in making load distribution decisions. The policy engine in conjunction with the router uses the information/parameters to determine the configuration of the class and cluster(s), as well as in making load distribution decisions. The policy engine repackages some of the information into a Simple Network Monitoring Protocol (SNMP) MIB. The SNMP MIB provides access to these important real-time site performance metrics via an industry standard SNMP MIB browser.

Class of service (COS) involves the classification of incoming requests by the policy engine, into classes based on the Source IP address, Destination IP address, Port Number, URL, service or protocol, virtual site, transaction or request, or authenticated user. Backend server sites are clustered into virtual user definable cluster groups. Each cluster group can be managed/designated with a particular class of service. Based on its class, the connection/request will be directed to one of the clusters. The specific machine selected will depend upon the load balancing algorithm defined for the cluster or class, and implemented as a function of the parameters reported to the policy engine, for making load balancing decisions. An adaptive balancing module balances the number of service hosts in a cluster dynamically and guarantees optimal use of the resources by moving unused resources to service requests as needed. Based on information/parameters received via a UDP packet and based on service level commitments, the composition of the clusters can be changed dynamically by the adaptive module so that service level metrics fall within committed levels.

In further accord with the invention failover capability for the router provides service with minimum disruption in the event of a hardware or software failure by providing a redundant (secondary) optional warm router. The redundant router will assume the functions of the failed (primary) router. The primary and secondary routers are configured as symmetric peers with each having a single Network Interface Card (NIC) and Internet Protocol (IP) address, however, the IP address of the primary will be the only published address.

In still further accord with the invention, a control center implementing a central control Graphical User Interface (GUI) allows administrative users, e.g. Internet Service Providers ("ISPs"), and IT/IS administrative personnel for e-commerce merchants, corporate organizations, and customer service organizations, to interact with the system. The control center provides a means for starting and stopping all services; for configuring the services and for editing existing services.

Features of the invention include selectively grouping servers/hosts ("service hosts") into clusters; recognizing and categorizing incoming traffic or requests based upon their domain of origin, transaction, URL, service or protocol, Source or Destination IP address, virtual site, or based upon authenticated user name and then directing client requests to a specific cluster to provide differentiated service. Assigning more resources to a cluster to support higher end requests guarantees that more resources are available to this class, and it is given priority over other classes. Further, load balancing among service hosts in a cluster avoids the imbalance of load among members of a cluster.

A high level of service that is responsive to the individual needs of the site's users can be provided. Service providers can determine how many service hosts they will assign to a hosted site based upon tiered Service Level metrics. Assigning service hosts to clusters provides for another means of providing differentiated services. Service providers can provide users with access levels and content that is appropriate to their subscribed Class of Service or Service Level Agreement (SLA). ISPs can enter into SLAs with virtual web site hosting customers where they will be able to guarantee response times, error rates, access to site resources and generate quantifiable periodic reports to measure the SLA metrics. Based on SLA metrics corrective actions can be taken so that response times, open connections, and percentage of content and server related errors fall within acceptable levels.

Routing by class ensures that users are directed to web servers and content commensurate with their service levels, enabling sites to meet user's expectations. ISPs can guarantee network uptime and also assure site and content availability and response times commensurate with SLAs. Clustering service hosts into groups based on service level metrics, in conjunction with network level COS protocols guarantees the delivery of end-to-end policy metrics of a policy-enabled network.

BRIEF DESCRIPTION OF THE DRAWINGS

These and other features of the present invention will be better understood in view of the following detailed description taken in conjunction with the drawings, in which:

FIG. 8a–8f are graphical user interfaces for a GUI control center for controlling the illustrative embodiment of the class of service implementation according to the invention.

DETAILED DESCRIPTION

Figure 1:
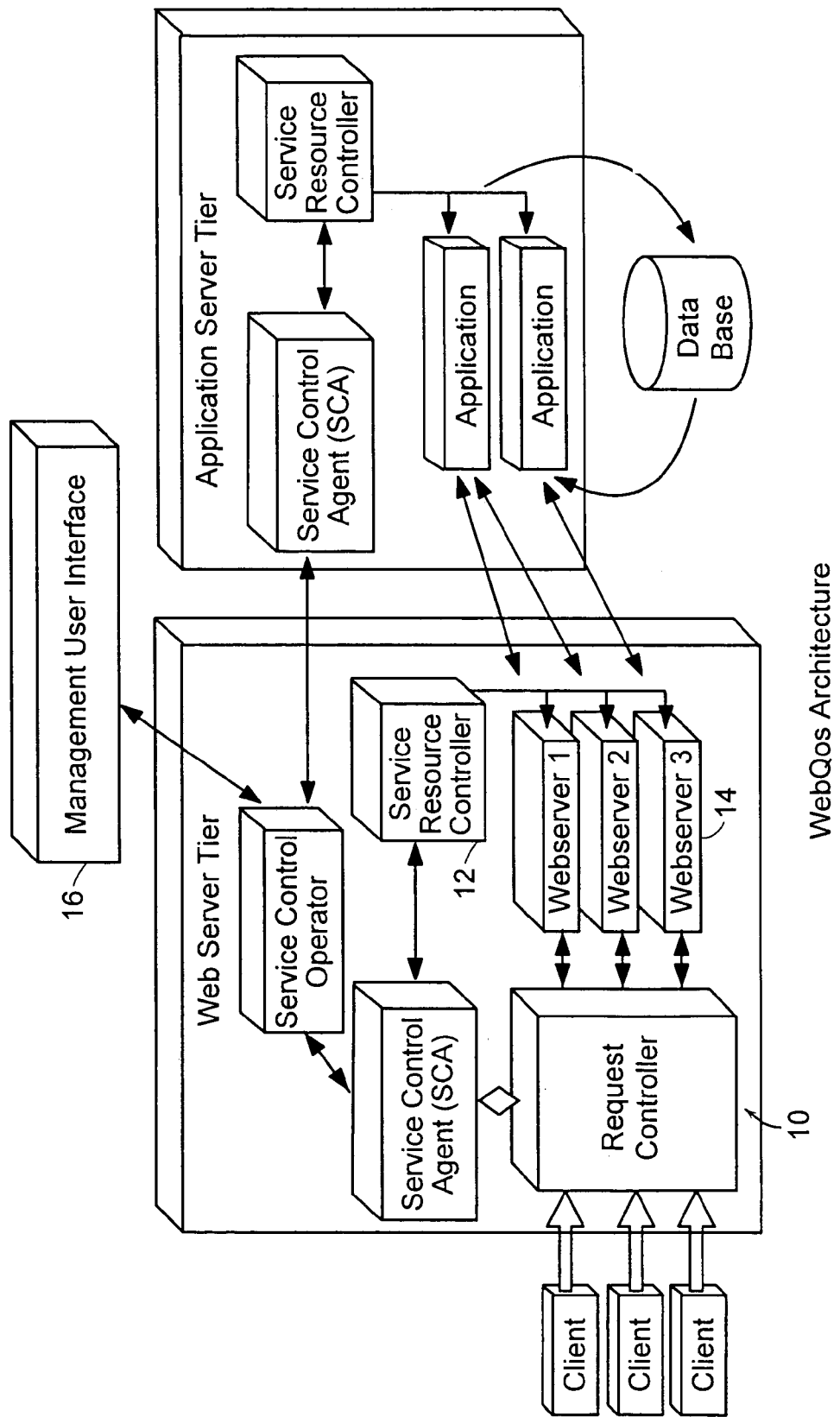
FIG. 1 is a functional block diagram of HP WebQos as known in the art.
Figure 2:
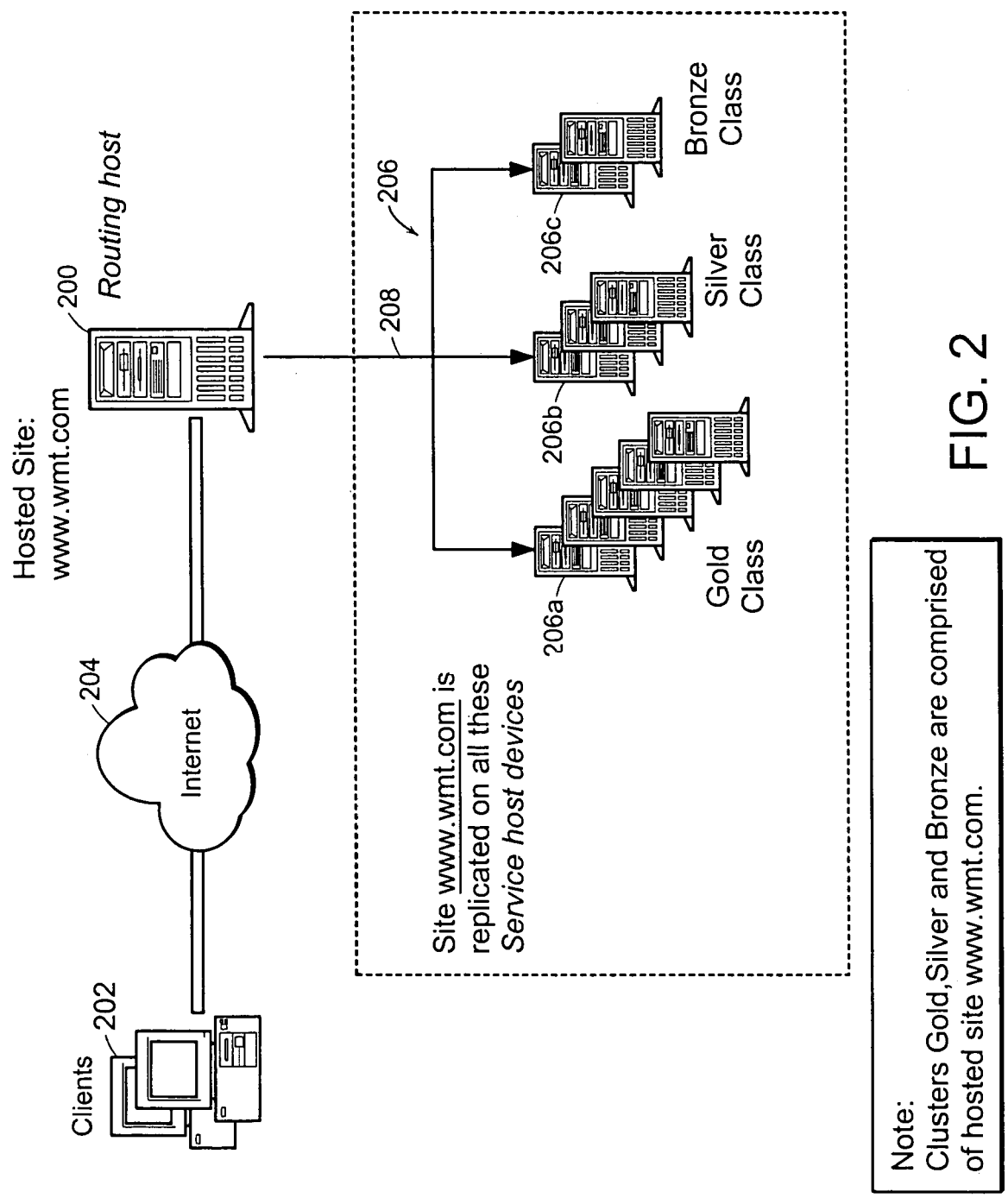
FIG. 2 illustrates a layout of a routing host, service hosts and illustrative class definitions according to the invention.

As illustrated in FIG. 2, hosted web sites are distributed among several host computers. One host among these, referred to as the routing host 200, is capable of receiving requests from one or more client devices 202. The request, such as over the Internet 204 in accordance with HTTP, is typically to access content from a hosted site maintained on a back-end server referred to as a service host 206. The routing host (or router) 200 is not capable of servicing requests from client devices 202, rather, it routes the request(s) to service hosts 206 which then service the request and send back response data to the client 202. The routing host 200 in the illustrative embodiment according to the invention reroutes these requests based on policies described hereinafter. The plurality of service hosts 206, in this illustrative implementation, are organized into groups (206a, 206b and 206c) referred to as a cluster. In the illustrative embodiment, the service host devices are each members of a Local Area Network ("LAN") 208.

Grouping of service hosts 206 for a hosted site into clusters facilitates provision of differentiated service. The configuration also allows for clustering virtual sites into groups that can be defined to provide such differentiated service. Clusters are created based upon the capabilities of the computers that host them, as well as the business policies of the site. The method and apparatus according to the invention allows the creation of an unlimited number of clusters and corresponding differentiated service(s). For example, as illustrated in FIG. 2, three groups may be defined called Gold, Silver and Bronze. The Gold group is comprised of a cluster of five devices, Silver of three devices and Bronze of two, thus providing more CPU bandwidth and service host device resources to the Gold cluster than to Silver or Bronze clusters. Grouping service hosts into clusters, along with recognizing and categorizing traffic based upon their domain of origin, URL, transactions, service or protocol, Source or Destination IP address, virtual site, or based upon authenticated user name as described hereinafter, and then directing client requests to a specific cluster provides preferential and differentiated service. Further, assigning more resources to a cluster to support higher class requests guarantees that more resources are available to this class, and this class is given priority as compared to other classes. Further, load balancing among service hosts in a cluster, as described hereinafter, further avoids the imbalance of load among members of a cluster. For practical commercial purposes, service providers can determine how many service hosts they will assign to a hosted site based upon tiered Service Level metrics. Assigning service hosts to clusters provides another means of providing differentiated services. Clustering service hosts into groups based on service level metrics, in conjunction with network level Cos protocols guarantees the delivery of end-to-end policy metrics of a policy-enabled network.

Figure 3:
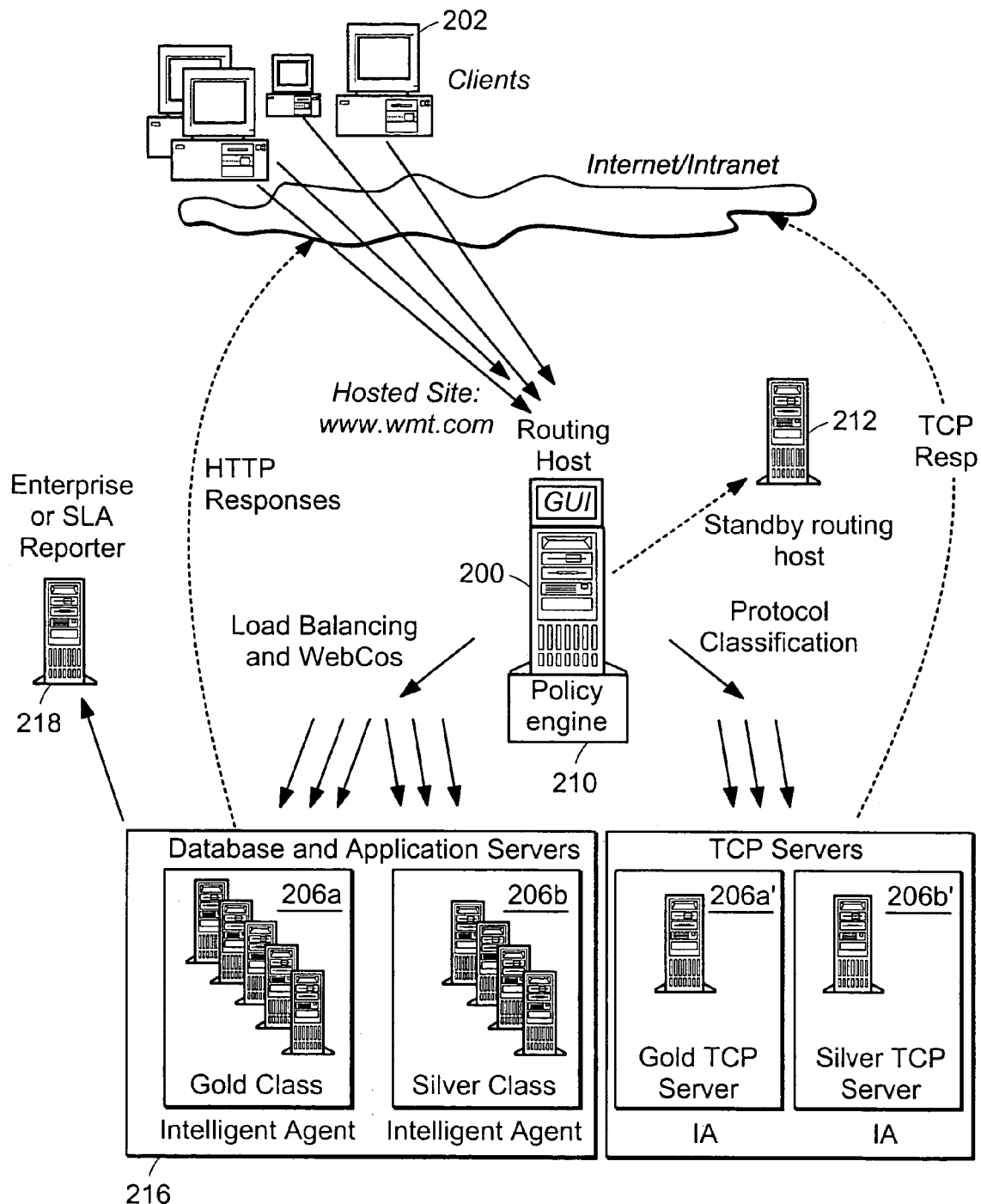
FIG. 3 illustrates further detail of the embodiment of FIG. 2.

Referring now to FIG. 3, the illustrative routing host 200 provides a front-end processor in the form of a TCP router configured to receive all client requests for sites and virtual sites implemented on the plurality of back-end servers 206. A monitoring processor adaptive policy engine 210, in communication with the router (and agents on back-end servers) dynamically monitors workload and availability of servers 206 to enable requests to be sent to the most appropriate and optimal server. All requests from clients 202 will go to the router 200. The IP address of the router 200 is mapped to N load balanced back-end servers, e.g. 206a, 206b, 206a', 206b'. Routing is done at the packet level by re-writing the destination MAC address to be that of the designated back-end server. Packets are then retransmitted back on the LAN (208, FIG. 2). The back-end server(s) 206 will then receive the packet, process it and respond back directly to the client 202. No source IP address changes are needed in the outbound traffic as the Router 200 and back-end servers 206 make no IP address changes to the original incoming packet. It should be noted that the router IP address only is published but the addresses of the back-end servers stay unpublished. The back-end servers are configured so that the server will accept incoming packets directed to it but will not respond to TCP/IP Address Resolution Protocol (ARP) Media Access Control (MAC) address requests. That is, the back-end servers use un-ARPed addressing. This is achieved by adding loopback alias devices. Each of the back-end servers by installing a loop-back driver, such as the Microsoft Loopback adapter available on Windows NT.

In the illustrative embodiment, the issue of scalability in terms of the load that the router can handle is dealt with by adding more Routers into the fray. The implementation uses Round Robin-Domain Name System (RR-DNS), as known in the art, to load balance between a plurality of routers where scalability is anticipated. The site will contain several advertised DNS addresses—one for each router. The DNS will switch traffic to one or the router. Once the router is selected to handle a request, all the subsequent flows from the client will flow through to this router until the connection is either broken or it times out.

The single point of failure represented by the router 200 in this architecture is addressed by installing a warm standby 212 for router failover. The failover capability provides service with minimum disruption in the event of a hardware or software failure by engaging the redundant [secondary] warm standby system 212. The redundant system will assume the functions of the failed [primary] main system. The primary and secondary are configured as symmetric peers with each having a single NIC and IP address. However, the IP address of the primary will be the only published address. The illustrative system provides an automatic failover capability, wherein only catastrophic failures of the Router are considered for failover. The situations warranting failover include: power loss to the primary router; network disabled, e.g. network wire comes undone; and failure of the NIC card. It should be appreciated that other conditions could warrant failover and the illustrative system could be reconfigured to accommodate such conditions.

Failure within the purview of the illustrative system's problem domain can be defined as the condition or conditions under which the router and the host system it is deployed on are not responding in accordance to certain monitored parameters. With this definition in place, detecting a failure becomes a matter of defining the parameters and monitoring them. The illustrative router, implemented in an NT context, consists of a Network Drive Interface Specification (NDIS) driver inserted into the TCP/IP stack. The driver is self monitored. Failures in the driver are deemed catastrophic failures. A matrix of monitored parameters and their values is maintained, and if the values of these monitored parameters is compromised the driver will implode. The secondary has a Fail Over Service. In the event of a failover, the primary will send out a signal via a gratuitous ARP that the Fail Over Service on the secondary will be listening for. To detect a failed server, the secondary will expect a ARPs from the primary at regular intervals. If it does not receive an ARP for two consecutive time intervals, then the secondary will probe the primary by polling with pings. If there is still no reply from the primary then the failover will be initiated.

Fail back is also implemented wherein the Primary comes back on-line after a failure. In this implementation the two systems—primary and secondary—are assumed to be interchangeable. When the primary goes down the secondary comes up as the primary machine. During fail back, the machine that comes back on-line does so as a secondary. Essentially, the two machines flip back and forth as primary and secondary each time the primary fails and comes back on-line. The configuration parameters on the primary and the secondary are synchronized. In the event that any time modifications are made to the setup or to configuration on the primary, the secondary will be notified to update its repository with this information. During fail back, the repository from the up and running primary will be copied over to the secondary and in this way it will be in sync at startup.

Incoming traffic is first processed by the router 200 to assign a class. The policy engine 210 in conjunction with the router then intelligently distributes incoming traffic to the most available and/or efficient server within each class or "cluster," by using one or more of a plurality of selectable load distribution algorithms for the class/cluster. As described, the router or routing host 200 is capable of servicing requests from the client devices 202. Requests are directed from an individual client to an individual service host via the routing host. The requests may include data units such as packets, frames and cells that prompt transmission of web site pages in the case of a group that hosts an Internet Web Site. Each request is serviced by transmitting a response from at least one of the servers to the client device that transmitted the request. Each server in the group or cluster is capable of responding to requests of other servers in the group to promote load sharing within the group/cluster. Upon receiving a request from one of the clients, the router will reroute the request to another server in the group in accordance with predetermined criteria. The predetermined criteria for determining which cluster will service a request depends upon the nature of the request and the class of service allocated to that cluster/class. In the illustrative embodiment, the rerouting function is computed based upon the cluster/class policy being enforced.

Figure 4:
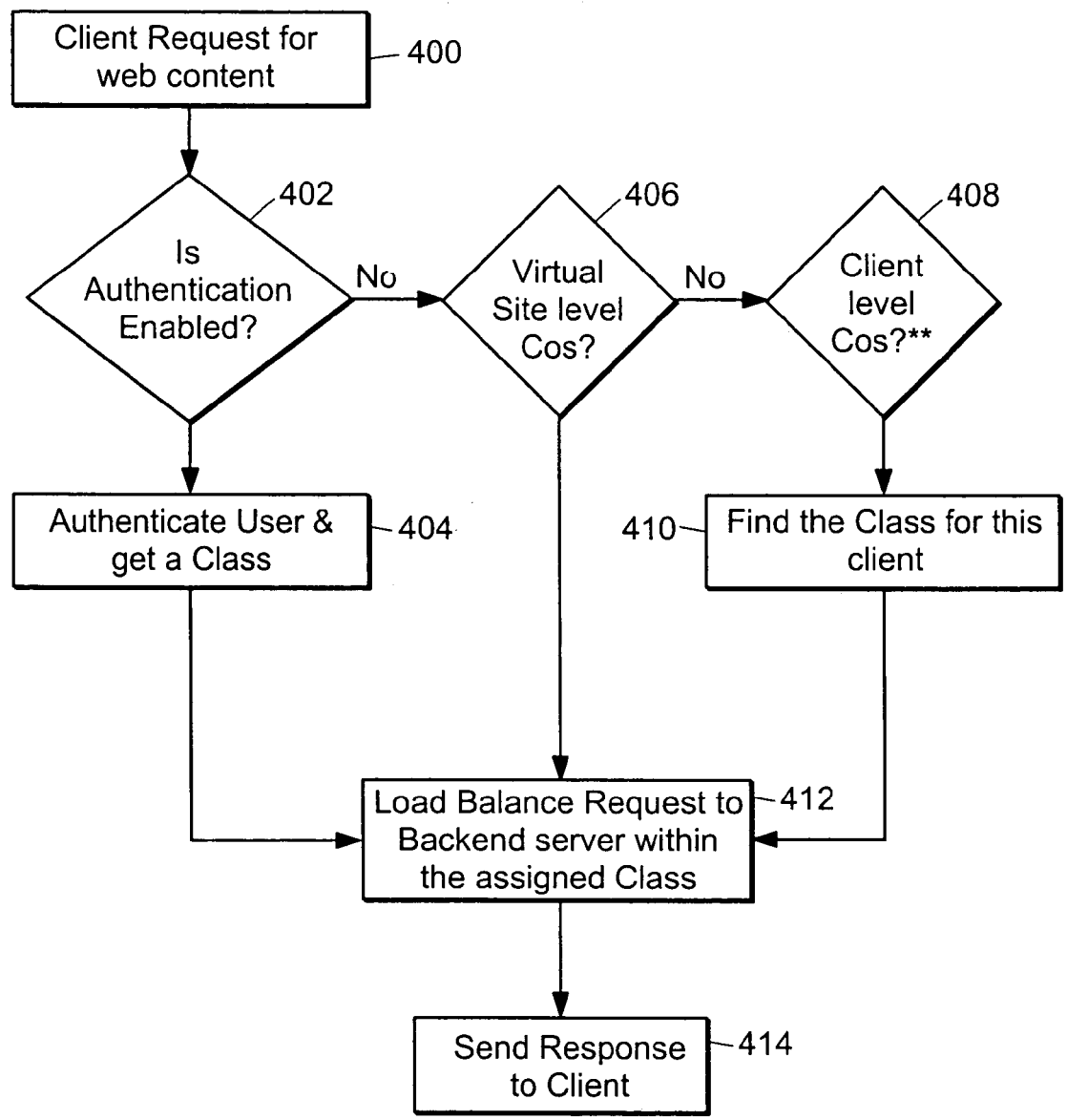
FIG. 4 is a flow diagram illustrating process flow for a client request and system response according to the invention.

Class assignment/designation is used to implement a threshold class of service in the illustrative embodiment according to the invention. Class of service (COS) involves the classification of incoming requests by the policy engine, into classes based on the Source IP address, Destination IP address, Port Number, URL, service or protocol, virtual site, transaction or request, or authenticated user. Backend server sites are clustered into virtual user definable cluster groups. Each cluster group can be managed/designated with a particular class of service. Based on its class, the connection/request will be directed to one of the clusters. As illustrated in FIG. 4, a client request for web content 400 is received at the router whereupon a determination is made as to whether a user authentication facility is enabled 402. If authentication is enabled then class of service (i.e. class) is implemented as a function of the user, and the user is authenticated and the respective class is assigned 404. If user authentication is not the basis for assigning a class, class may be assigned based on virtual host level class of service considerations 406. Virtual host level considerations include classification based on virtual host name. The policy engine includes protocol classification as a means of specifying policies for specific protocols. Based on the protocol, the policy engine can be configured to dictate how the packet is routed. For example, all FTP traffic can be shunted to a particular back end server. The router will classify a packet by examining the destination port and route the request appropriately. Protocol classification will handle traffic for: Ftp; Udp (stream—audio/video); Nntp; Smtp; and telnet. The GUI, described in detail hereinafter, will allow users to select a backend system to which to redirect the traffic based on the protocol.

Http will be treated differently, the full set of Load balancing and class of service policies will be applied to these packets. If host level class of service is not the consideration for assigning the request a class, then client level considerations 408 based on information available in the HTTP protocol will determine the class for the request. Accordingly, the particular class is assigned 410 as a function of the client level consideration. Client level class of service (COS) parameters are based on: Request/Transaction; Service/protocol; Authenticated User; URL; Destination Port; Domain of Origin; Source IP; Destination IP; and Application Requested. Classification of traffic based on the foregoing techniques will allow for differentiation of services based on user and virtual site. It also allows prioritization of revenue generating transactions versus non-revenue generating transactions. The specific back-end server machine selected for a classified request will depend upon the load balancing algorithm defined for the cluster or class assigned to the request, and the request will be load balanced to the particular back-end server 412. The particular server machine receiving the request will respond directly to the client 414.

The load sharing algorithms implemented in this illustrative embodiment to assign requests to particular back-end servers within a cluster include: weighted percentage load balancing; round robin load balancing; CPU availability load balancing; least connections load balancing; and probabilistic load balancing. Load balancing is especially important for high traffic, multi-server web sites where it is difficult to predict the number of requests that will be issued to any one server. All client requests sent to the illustrative implementation are routed to the server selected as the most available and/or efficient server within each class according to a selected load balancing algorithm. The user or site administrator can select the load distribution techniques to correspond with a particular class.

The weighted percentage load balancing predictor option allows the site administrator to assign a performance weight to each server. Weighted load balancing is similar to least connections, but servers with a higher weight value will receive a larger percentage of connections at any one time. Using this technique, the site administrator can direct all processor intensive requests, like JAVA applets or ASP page requests, to the high-end server (like dual Pentium II 400 MHz), while sending requests for static content to a low-end server (like Pentium 200 MHz) in a particular cluster.

The round robin predictor option directs the incoming traffic to the next server, and treats all servers within a cluster as equals regardless of number of connections or response time.

The CPU availability load balancing option directs the incoming traffic to the server with least CPU load.

The least number of connections load balancing method provides the ability to load-balance based on the number of active connections a single server in the web backend has at any given time. Once the number of predetermined connections is exceeded, the system redirects requests to another server with fewer connections. It should be appreciated that the, weighted percentage, round robin, CPU availability and least number of connections load balancing options can be implemented using various known in the art algorithms that enjoy multi-platform support-independent of hardware and web server environment.

Figure 5:
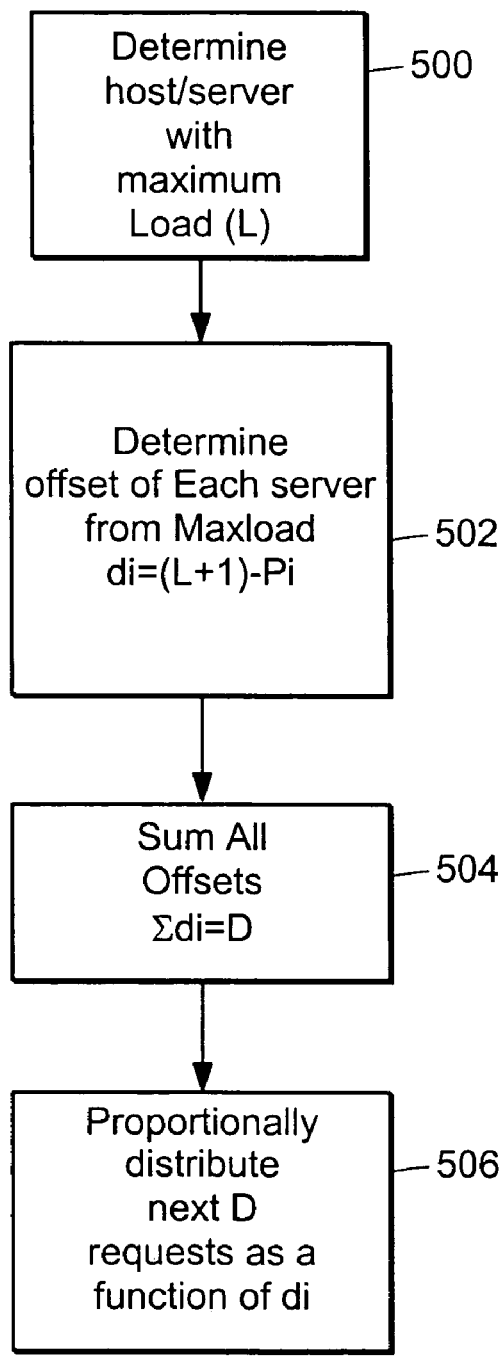
FIG. 5 is a flow diagram illustrating probabilistic load balancing according to the invention.

The probabilistic load balancing algorithm is implemented according to the invention in a manner illustrated in FIG. 5. The probabilistic load balancing algorithm illustrated determines the number of connections to be routed to a particular server by looking at the offsets of each server's load from the host with the maximum load. The first step 500 is to find the most loaded server and call this load "L". Then the difference of each servers load from the load L+1 is computed 502. This can be expressed as $di=(L+1)-Pi$, where Pi is the current load of each server and di is the difference for that server. Then all of the offsets di are summed 504, and that sum can be referred to as "D." The next D requests are then proportionally distributed 506 to the servers based on their respective di's. This allows routing, in the next iteration, more requests to servers that reported relatively light load.

Web server load balancing makes it easy to take server hardware off-line for maintenance and to provide continuous service despite equipment failures. Integrated selectable load balancing in conjunction with class assignment reduces total cost of site ownership, and improves site performance and response times. Efficient traffic management prevents server bottlenecks and breakdowns. Further, additional servers can be added easily and seamlessly to meet increases in traffic.

Thus each back-end server in communication with the router is subject to a selectable one of a plurality of load balancing algorithms so that traffic is routed to the plurality of back-end servers, as a function of class, in a manner that maintains consistent response times and service level commitments even with increases in traffic and processing loads. All load balancing algorithms except the stateless round robin algorithm are implemented as "session aware." That is, subsequent requests from the same client will be routed to the same back-end server. Client IP address and Port are used to uniquely identify a session. If a back-end virtual site goes down while still in the same session, the session is moved over to a different back-end server. The router will also be aware of the state of each back-end server in a manner as described hereinafter, and will therefore be able to redirect requests around any failed server.

Referring again to FIG. 3, intelligent agents 216 deployed on each of the back-end servers monitor several server attributes/parameters and report back to the policy engine at the router in order to provide feedback for maintenance of the attributes/parameters, and ultimately maintain service level requirements for each class. The server attributes reported to the router include: online/offline status; total hits per second; CPU utilization (i.e. number of processors and utilization); number of processes; total open connections; disk space (i.e. disk size in bytes, bytes used, percent used, percent free); response times of back-end servers; URL/content availability; server and virtual site availability; and memory utilization (i.e. total memory, memory used, free memory). For each virtual site and for each web farm, online/offline status; total hits per second; and total open connections are monitored by the intelligent agents and reported back to the policy engine for each virtual site and for each web farm.

These parameters reported to the router are available via a Management Information Base (MIB) kept by the policy engine on the router. The policy engine receives this information (i.e. parameters), by a lightweight User Datagram Protocol (UDP) packet that is assembled by the intelligent agents on the back-end servers. The UDP packet is multicasted onto the network via a heartbeat structure configured in the network. In the heartbeat UDP structure a socket is created to multicast the UDP to a non-routable multicast address. The packets are multicasted every so often. For example the frequency of multicast can be set to a minimum of 100 ms. The UDP structure also contains server status information such as sites available and server name. The router itself is setup to listen to packets on multicast channels from specific servers. The list of servers is made up of the backend servers that the router is currently routing to. When a multicasted packet arrives at the router, the router picks it up and deciphers the content which is comprised of the back end server status information. The information is stored in the router's tables. The router then discards the UDP packet.

An API is provided to expose these parameters. The policy engine connects to the router through the API. The policy engine uses this API to access the parameters and compile into a MIB. The multicasted packet is picked up by the policy engine and the information is used for policy management. The policy engine repackages at least some of the information into a Simple Network Monitoring Protocol (SNMP) MIB. The SNMP MIB provides access to these important real-time site performance metrics via an industry standard SNMP MIB browser, such as might be available on a remote reporter system 218. Real-time site monitoring is provided by the fully integrated SNMP MIB. Real-time access is provided to important real-time site performance metrics, i.e. the performance data obtained from the intelligent agents 216, which are located on every back-end server 206 to manage and monitor Web server resources. With the implementation according to the invention, and an industry standard SNMP MIB browser, it is possible to: obtain status of all servers handling requests; monitor real-time performance of each server; obtain status of web sites handling requests; and monitor real-time status of traffic flow to the web server's performance.

The information in the UDP packet is also made available by the policy engine to application layer programs (i.e. on an NT platform via performance monitoring registers, "perfmon registers"). For determining the presence of failed servers and sites, an application layer program monitors the backend server's and site's status information. HTTP requests and ping techniques are used to implement the failed server/site monitor. When a failed site or server is detected the application layer communicates with the router via an API, to remove the failed system(s) from the configuration.

The policy engine uses the UDP packet information, in conjunction with the router, in making load distribution decisions. Based on information/parameters received via the UDP packet, the composition of the clusters can be changed dynamically based on service level commitments. The policy engine in conjunction with the router uses the information/parameters to determine the configuration of the server cluster, as well as in making load distribution decisions.

Figure 6:
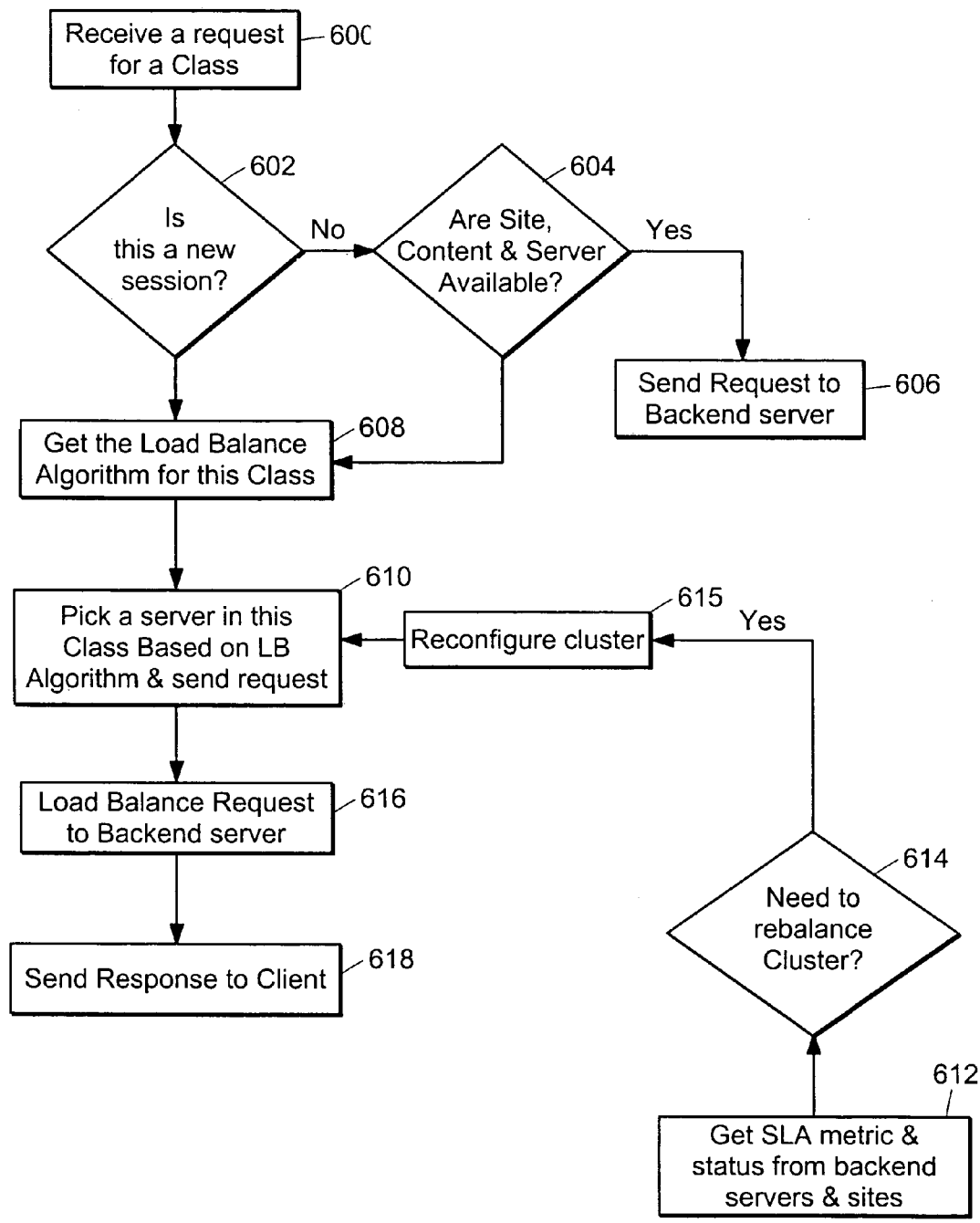
FIG. 6 is a flow diagram illustrating process flow of the adaptive policy engine according to the invention.

FIG. 6 provides a flow diagram illustrating process flow of the Adaptive Policy Engine according to the invention. The Adaptive Policy Engine (APE) is employed to monitor the incoming traffic to the routing host, looking to see a request for a class 600. Traffic is measured to each hosted site and further, to each class of a hosted site, to each URL, content type, or file type. The APE has a rules based engine that correlates this information and uses it to come up with dynamic, real time balancing scheme for each class. The APE first checks to see if the incoming request is a new session 602. If it is not a new session, the policy engine checks to see if the previous site serving the content is available 604, as the policy engine seeks to maintain the connection with the server previously serving the request. If the previous server and content is available the request is sent to that back-end server 606. If the request is not a new session or the server/site/content of an old session is not available, the load balancing algorithm is run 608 for the class of the request. The request is then sent to a server serving that class, based on the selected load balancing algorithm 610.

Figure 7:
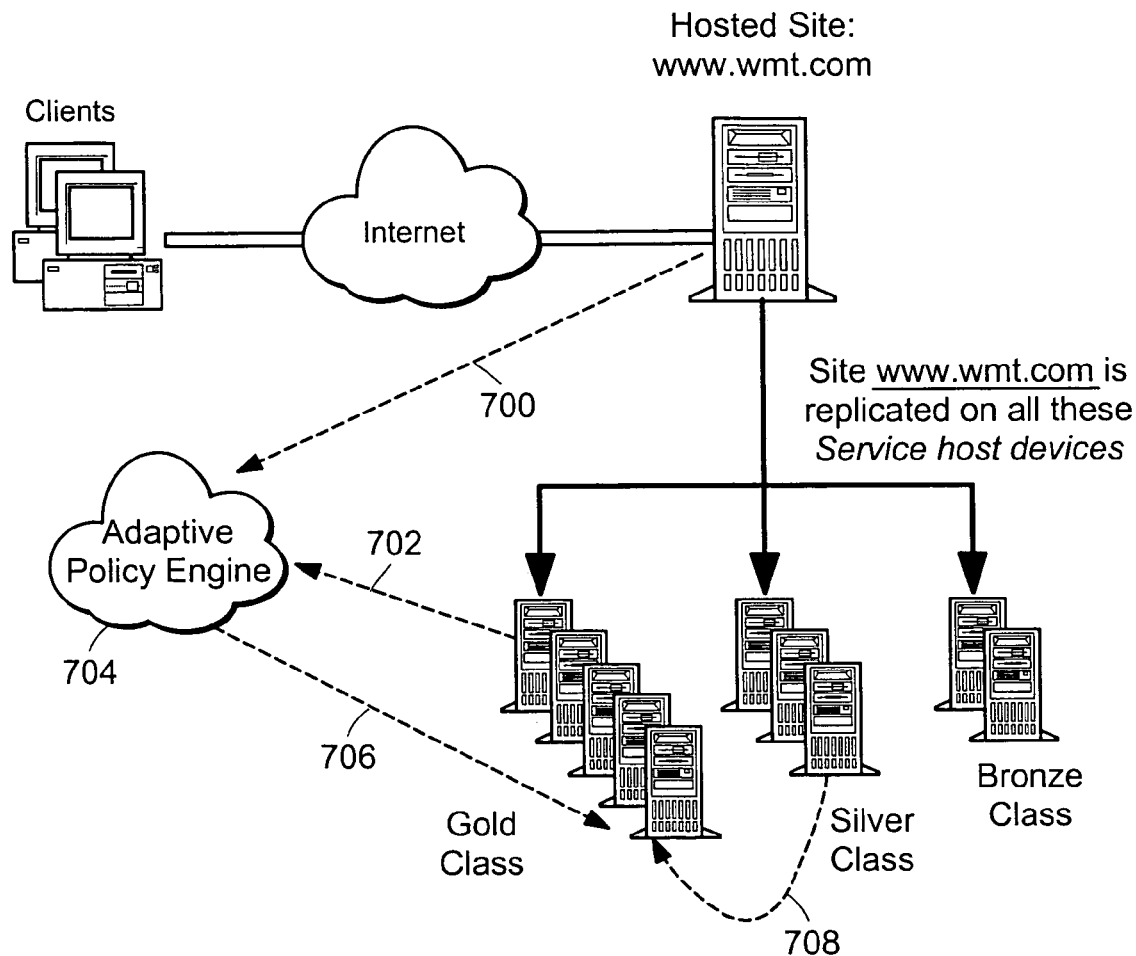
FIG. 7 illustrates adaptive cluster balancing according to the invention.

The allocation of the request to a server 610 may be affected by adaptive cluster balancing according to the invention, as illustrated in FIGS. 6 and 7, which is implemented in an adaptive control module in the policy engine. The configuration of backend web servers is initially setup by an administrator, via a GUI, by classifying the servers into different class or clusters. The administrator determines the threshold levels for Service Level metrics for each class based on the Service Level commitments. In the dynamic environment, as web site users are making requests on this web site, the response times, traffic patterns, and the overall behavior of the web servers in that class determine the user experience. In the case of heavy loads which could be a result of heavy traffic or type of transactions or the over loading of the parameters on the back end web servers, the SLA metrics of this class, such as: response time by user; URL; request; transaction type; content type; application type; service/protocol type; domain of origin; file size; online/offline status; total hits per second; CPU utilization (i.e. number of processors and percent utilization); number of processes; total open connections; disk space (i.e. disk size in bytes, bytes used, percent used, percent free); response times of back-end servers; URL/content availability; server and virtual site availability; application availability; and memory utilization (i.e. total memory, memory used, free memory), may be compromised for this class. In this situation, the adaptive control module of the Policy Engine is invoked, effecting the adaptive policy engine, to rebalance the server assignment of the affected class.

Web site and web server parameters and status 612 are determined from the back-end servers, and SLA metrics are monitored, and fed into the adaptive policy engine 700, 702. The Adaptive Policy Engine 704 intelligently determines if the behavior of the class is within the pre-configured SLA commitments for a class. A thresholding mechanism is used to set the acceptable range for each service level metric. If the threshold is exceeded, the policy engine has determined a need to rebalance a cluster 614. It tries to find the most available back end server in another cluster 706 and moves it into the cluster 708 where the threshold was exceeded for that Service Level metric. Thus the cluster is reconfigured 615. This process is repeated until the system is rebalanced so that the committed Service Levels are within acceptable range for that class. The processing of the request continues as the load balanced request is sent to the appropriate back-end server 616. The appropriate back-end server then sends a response directly to the requestor/client 618.

Administration and interaction with the class of service system according to the invention, is via a control center. The control center is implemented via a central control Graphical User Interface (GUI) that allows users, e.g. Internet Service Providers ("ISPs"), e-commerce merchants, corporate organizations, customer service organizations, to interact with the system. The control center provides a means for starting and stopping all services; for configuring the services and for editing existing services. The services that run under the GUI are: an Administration User Interface (Admin UI); Web Server Management & Monitoring; Web Site Management; Hosted Site Management; Load balance and COS Management; Logging Management; Router Management; License Management; and Fail over Configuration.

An Admin UI, not shown, contains the GUI for Adding and Editing admin users, passwords and their access privileges. It also has general information display about license currently installed and the license parameters such as expiration date, number of servers supported, etc.

Figure 8A:
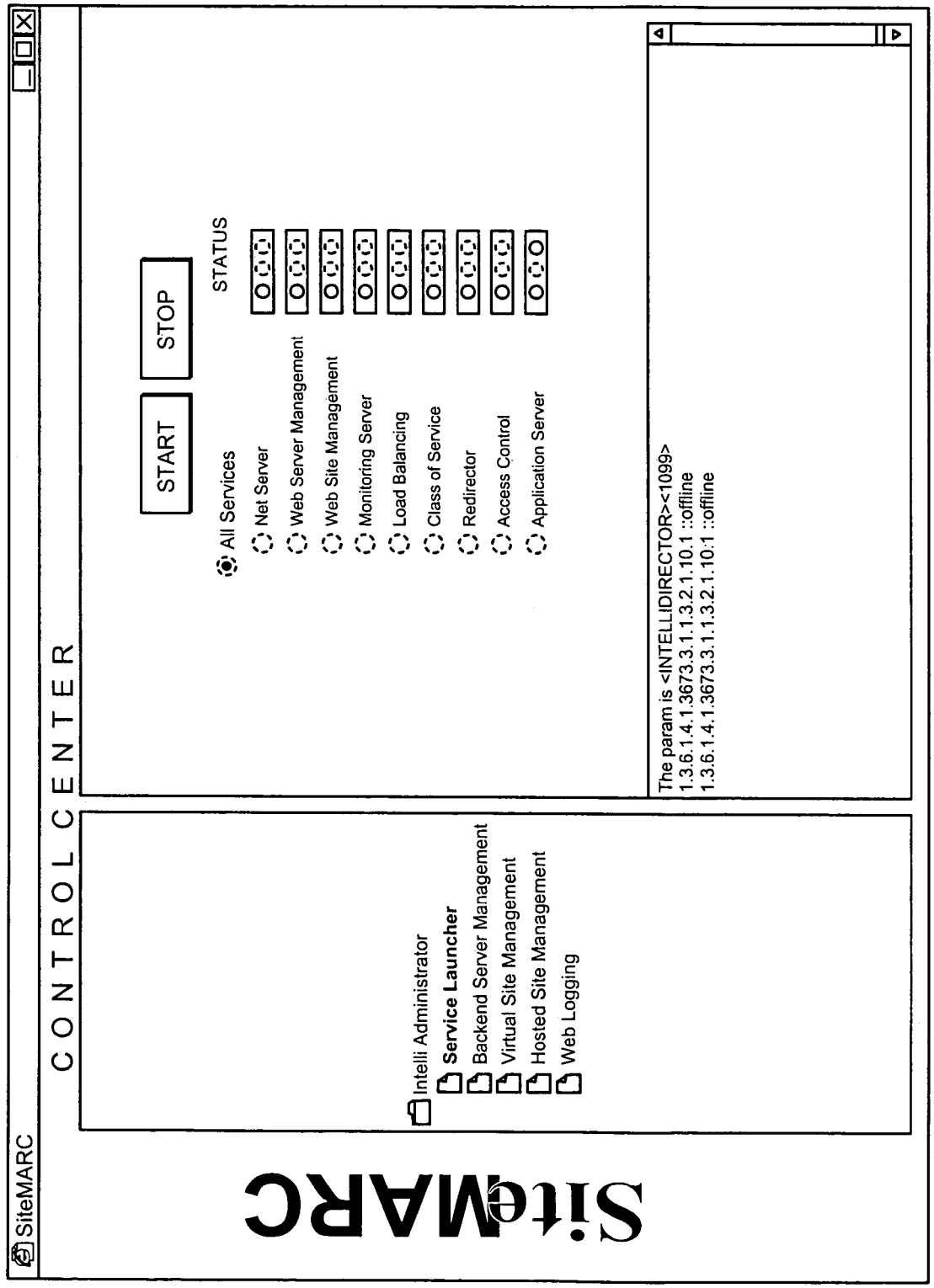
Figure 8B:
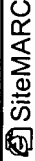

A Service Startup or Service Launcher GUI, illustrated in FIG. 8*a*, allows users to start and stop services. The shutdown choices will allow: shutting down the Primary without triggering fail over; shutdown the Primary and automatically trigger a fail over to the Secondary A Manage Back-end Servers GUI, illustrated in FIG. 8*b*, allows users to add, modify or delete back end server machines in the system. This GUI will also contain the parameters for monitoring the back end server. Monitoring information will be used to monitor back end servers and virtual sites. Again, agents deployed on back end machines monitor performance parameters, these parameters are packaged into UDP packets multicasted onto the LAN. The Router listens for these packets, and supports an API that enables the system to access the monitored parameters. Other miscellaneous information will also be displayed in this UI. This data will mainly be provided for informational purposes, and includes information such as machine type, operating system and OS version. This UI is also be used for specifying the Weight of a back end server, this information is used by the "Weighted Server" load balancing algorithm.

Figure 8C:
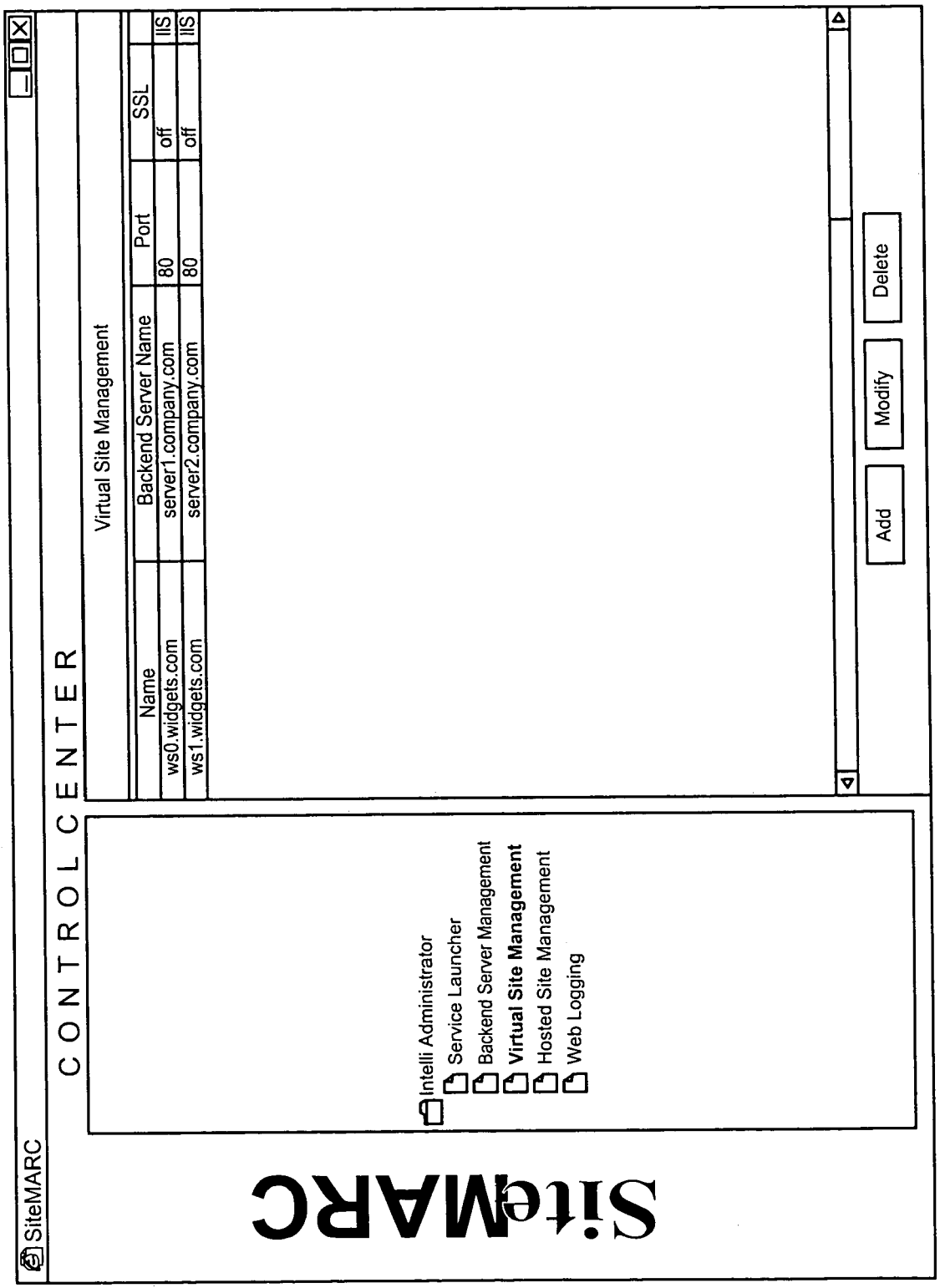

A Virtual Site Management GUI, illustrated in FIG. 8*c*, allows users to add back end virtual servers and associate them with back end server machines. The information is displayed in a tabular format, the table shows the association between a back end server and the virtual sites that are hosted on it. The back end web server type (e.g. IIS, Netscape, Apache, etc.) will also be displayed in this UI.

Figure 8D:
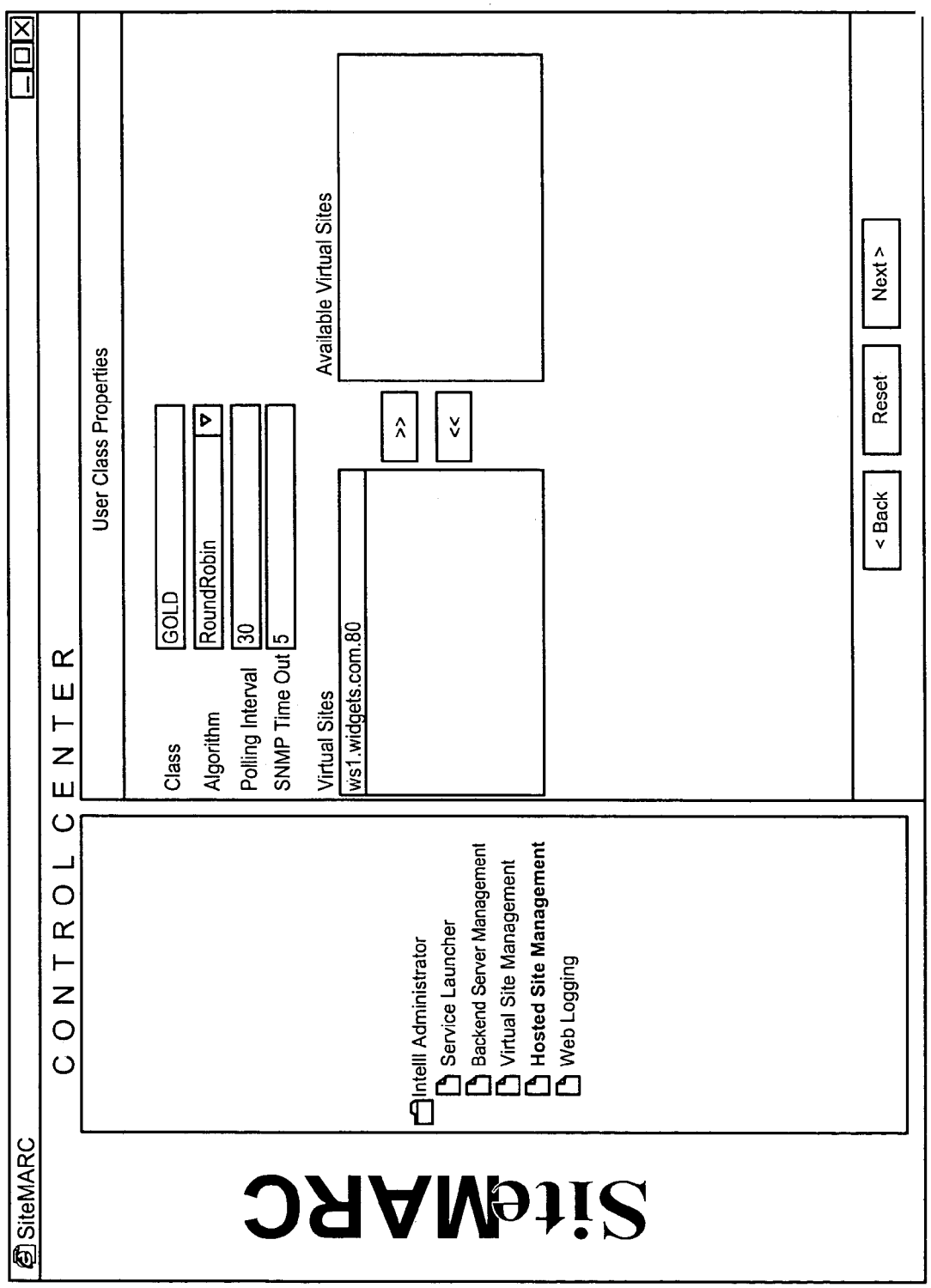

A Hosted Site Management GUI, illustrated in FIG. 8*d*, allows users to add, modify or delete front-end hosted web sites. It will also allow users to associate backend sites to hosted web sites.

Figure 9:
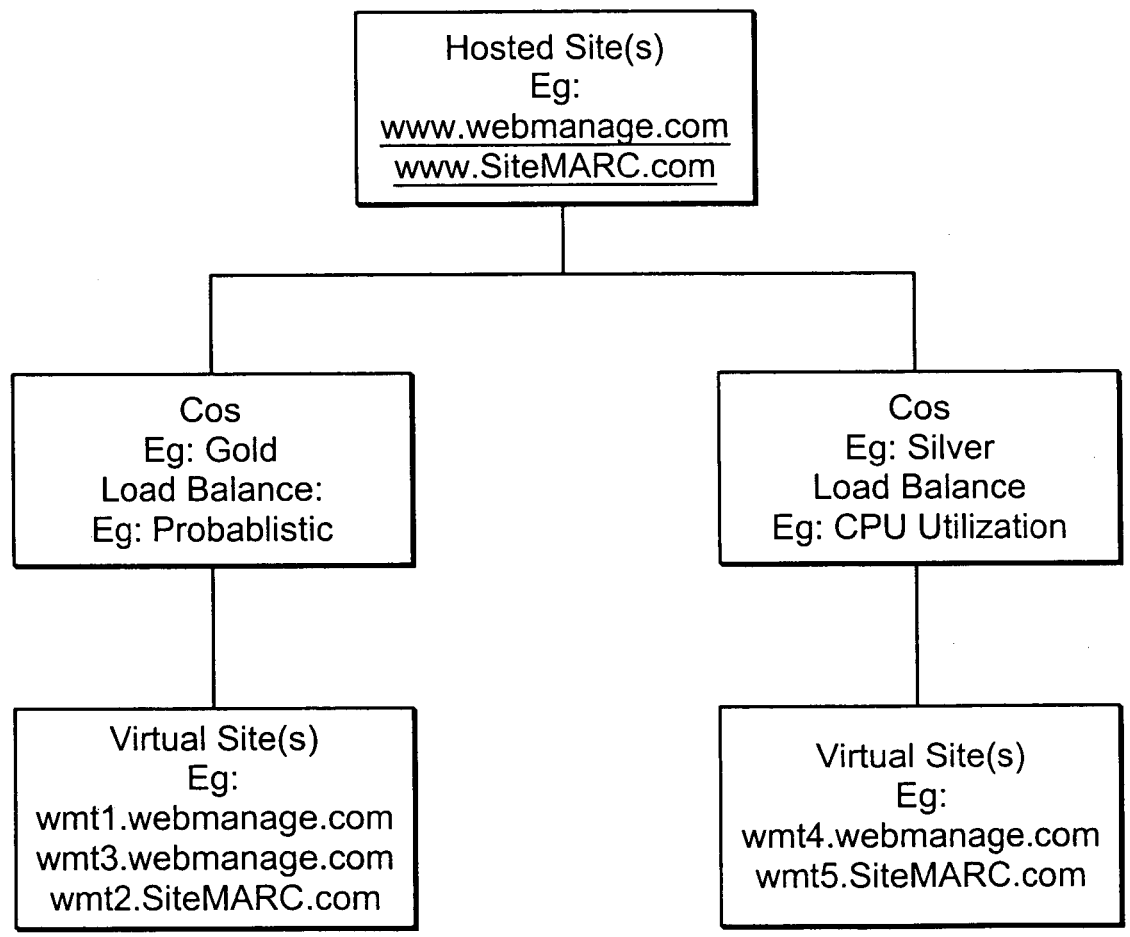
FIG. 9 is a block diagram illustrating the relationship between a hosted site and a virtual site.

In a Load balancing and Cos GUI illustrated in FIG. 8*e*, a user interface is provided to select a hosted web site to manage, to select a Cos for it, and to add the back end virtual sites to it. This GUI also lets the user define a load balance algorithm to use for this site/Cos. The UI shows the relationship between a Cos and the hosted site and the back end virtual sites associate with it. FIG. 9 illustrates the relations between these entities. The UI will allow you to: add virtual sites to a class; modify virtual site assignments.

This UI will allow users to add a new Cos and specify the Source IP address and the destination port number that belong to this class. For example, if a class is defined, to meet certain performance criteria, as Gold, the user can then enter Source IP addresses and/or Port Numbers that will be treated as Gold. A user configurable precedence order is defined to break conflicts. This will ensure that the request gets the best Cos. In the illustrated example: a new class Gold is defined, Gold has a precedence of 2. The source IPs and the Dest Ports that are to be treated as Gold are listed. When traffic arrives at the Router, the Router looks up in this list to classify the request. If an IP or Port is defined in two classes, then the one with the higher precedence will be used for directing the traffic. In the example, if a Source IP-209.5.4.3 is in Platinum (which has precedence 1) and as shown in the figure in Gold as well, the request will be classified as a Platinum request. It should be noted that it is really moot to use destination IP address, since the Cos decision making happens at the destination IP level.

A Protocol Classification GUI (not shown), will allow users to direct traffic based upon the protocol. As described hereinbefore, a specific back end server can be assigned to each supported protocol. The supported protocols are: FTP; NNTP; SMTP; UDP; and telnet. The UI will allow users to associate a back end server to each of these protocols. For example, FTP protocol may be directed to a specific back end server that is solely dedicated to handle FTP (download) traffic. An exemplary GUI for protocol classification (FTP) is illustrated in FIG. 8f.

There is a GUI associated with the router, which is effectively a function of the type of router used. The Router Setup GUI has the setup information for the Router driver. It will allow the user to modify parameters relevant to the driver such as buffer sizes etc. Also, if failover is implemented there is a Failover GUI that lets users enter the information about Primary and Secondary system, e.g. the IP addresses corresponding to them, the frequency for the ARP for the failover implementation option as described hereinbefore.

While the method and apparatus described herein includes a routing host indicated as a "router" or "TCP router," it should be appreciated that other switching hardware could be implemented including other, non-standard, routing software incorporating the intelligence and functionality described herein, such as switches, general purpose computers, or the like.

Further, it should be appreciated that although the illustrative embodiment herein is described in the context of a Windows NT platform, other platforms could provide the basis for implementation of the functional components described herein, such as Solaris, Linux, other UNIX variations or the like.

Although the functionality described herein is particularly implemented and divided between the router, policy engine and the back-end servers/intelligent agents, it should be appreciated that the functionality could be alternatively divided and implemented. For example, certain functionality on the router could be implemented on the servers and vice versa. Similarly, although the functionality is generally described implemented as software processes, it should be appreciated that such functionality can be alternatively implemented as hardware, firmware and/or any of various combinations of hardware, software, and firmware.

While particular sets of parameters, i.e. server attributes, are reported to the router in the implementation described herein, it should be appreciated that parameters other than those described could be reported as a function of the server information available, such as the types of files or size of files, or the like.

Although particular load balancing algorithms, including: weighted percentage load balancing; round robin load balancing; CPU availability load balancing; probabilistic load balancing and least connections load balancing, are described in the illustrative implementation, it should be appreciated that other algorithms could be implemented to effect load distribution and/or balancing.

Although the invention is shown and described with respect to an illustrative embodiment thereof, it should be appreciated that the foregoing and various other changes, omissions, and additions in the form and detail thereof could be implemented without changing the underlying invention.

What is claimed is:

1. A method for implementing class of service among a plurality of clients sending requests seeking access to sites hosted on a plurality of back-end servers, comprising the steps of:
    grouping at least one of said plurality of back-end servers into a respective one of a plurality of service classes based upon an adaptive policy engine;
    receiving a client request for host access at a front end processor;
    selecting a class of service from said plurality of service classes according to at least one selected parameter of said request; and
    distributing said request to a back-end server in said selected class of service according to the load of each of said at least one of said back-end servers in the selected service class, said load dynamically reconfiguring said adaptive policy engine.

2. The method of claim 1 in which said selected parameters of the request are selected from a group consisting of: user authentication, virtual site level class of service and client level class of service;
    wherein a user authentication identifies a subscribed class for an authenticated user;
    a virtual site level class of service is determined by host name and selected protocol; and
    a client level class of service is determined as a function of the request/transaction, service/protocol, authenticated user, URL, destination port, domain of origin, source IP, destination IP, and application requested.

3. The method of claim 1 in which said step of distributing the request according to the load further includes a load balancing algorithm selected from the group consisting of: weighted percentage; round robin; CPU availability; least connections; and probabilistic.

* * * * *